US012251959B2

(12) United States Patent
Kokozidis

(10) Patent No.: US 12,251,959 B2
(45) Date of Patent: Mar. 18, 2025

(54) VARIABLE COLOR SHADE MARKER

(71) Applicant: BIC Violex Single Member S.A., Anoixi (GR)

(72) Inventor: Michail Kokozidis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 18/575,101

(22) PCT Filed: Jun. 15, 2022

(86) PCT No.: PCT/EP2022/066282
§ 371 (c)(1),
(2) Date: Dec. 28, 2023

(87) PCT Pub. No.: WO2023/274725
PCT Pub. Date: Jan. 5, 2023

(65) Prior Publication Data
US 2024/0300258 A1 Sep. 12, 2024

(30) Foreign Application Priority Data
Jun. 30, 2021 (EP) .................................... 21182693

(51) Int. Cl.
*B43K 8/04* (2006.01)
*B43K 8/02* (2006.01)
*B43K 8/03* (2006.01)

(52) U.S. Cl.
CPC .................. *B43K 8/04* (2013.01); *B43K 8/03* (2013.01); *B43K 8/024* (2013.01)

(58) Field of Classification Search
CPC ........ B43K 27/00; B43K 27/08; B43K 27/12; B65D 81/3222; B65D 81/3227
USPC .............................................. 401/44, 45, 47
See application file for complete search history.

(56) References Cited

U.S. PATENT DOCUMENTS 1,383,416 A * 7/1921 Mukojima ............... B43K 5/18 401/45
1,978,675 A * 10/1934 Kingman ................ B43K 5/18 401/41
2,052,500 A * 8/1936 Swartswelter ........... B43K 5/08 401/45

(Continued)

FOREIGN PATENT DOCUMENTS

CN 110281674 A 9/2019
EP 3798015 A1 3/2023
GB 629622 A 9/1949

OTHER PUBLICATIONS

Search Report and Written Opinion issued in International Application No. PCT/EP2022/066282, mailed on Aug. 29, 2022.

*Primary Examiner* — David P Angwin
*Assistant Examiner* — Bradley S Oliver
(74) *Attorney, Agent, or Firm* — Bookoff McAndrews, PLLC

(57) ABSTRACT

A writing instrument comprising an inner reservoir for storing a first medium, wherein the inner reservoir comprises at least one opening at a first distal area of the inner reservoir; a sleeve at least partially surrounding the inner reservoir; an outer reservoir for storing a second medium; and an actuator. The inner reservoir and the sleeve are movable with respect to each other by actuation of the actuator, and the inner reservoir and the sleeve are arranged at least partially within the outer reservoir.

20 Claims, 3 Drawing Sheets

(56) References Cited

U.S. PATENT DOCUMENTS

| | | | | |
|---|---|---|---|---|
| 5,911,533 | A | 6/1999 | Fassler et al. | |
| 6,739,779 | B1 * | 5/2004 | Deeds | B43K 8/03<br>222/137 |
| 9,862,224 | B1 | 1/2018 | Maresh | |
| 10,696,087 | B1 | 6/2020 | Maresh | |
| 2003/0123921 | A1 | 7/2003 | Abbas | |
| 2006/0210348 | A1 * | 9/2006 | Wang | B43K 5/18<br>401/45 |
| 2009/0154982 | A1 | 6/2009 | Khoshnevis | |
| 2009/0245920 | A1 | 10/2009 | Jeon | |
| 2010/0061793 | A1 | 3/2010 | Bender et al. | |
| 2019/0275827 | A1 | 9/2019 | Nguyen et al. | |

* cited by examiner

VARIABLE COLOR SHADE MARKER

This is a National Stage Application under 35 U.S.C. § 371 of International Application No. PCT/EP2022/066282, filed on Jun. 15, 2022, now published as WO 2023/274725 A1, which claims priority to European patent application No. EP 21182693.8, filed on Jun. 30, 2021, the entireties of which are incorporated herein by reference.

TECHNICAL FIELD

The present disclosure relates to variable color shade writing instruments.

BACKGROUND

Usually, to have different shades of one color, several writing instruments such as markers, highlighters and/or (shading) pens are needed, which may quickly be cumbersome for the user. In some cases, a marker with colorless ink may be used together with other markers with colored ink or with a blend of inks from different markers. Even though this solution may provide a shading effect, the effect may only be temporary and may not provide a constant and/or a uniform shading effect. Another solution may be to use liquid paints. Color shade versatility is quite good solved and easily approached with liquid paints but lack the mobility and/or agility of writing instruments such as markers, highlighter, or pens. Still another solution is the use of variable color instruments that present multiple colors or shadings. These markers have a complex structure and way of operation. Most of them employ pumps, electronics and need batteries to be operated. All of this raises the manufacturing cost of variable color instruments and hence the final cost to the user. Finally, the more complex the mechanism, the more prone to malfunctions it is, making these instruments unreliable.

The performance of the writing instrument such as markers, highlighters and/or (shading) pens may be further improved.

SUMMARY

According to the present disclosure, a writing instrument is provided. The writing instrument comprises an inner reservoir for storing a first medium, a sleeve at least partially surrounding the inner reservoir, an outer reservoir for storing a second medium, and an actuator. The inner reservoir comprises at least one opening at a first distal area of the inner reservoir. Further, the inner reservoir and the sleeve are movable with respect to each other by actuation of the actuator. Moreover, the inner reservoir and the sleeve are arranged at least partially within the outer reservoir. With this, a simple and compact design of a writing instrument with two reservoirs is created. The writing instrument may be a marker, a highlighter, a brush or any other type of pen used by e.g. artists. The writing instrument may make use of liquids such as water or alcohol based fluid to create e.g. shades of a color.

In embodiments, the actuator may be configured to be actuated by a user. The actuation of the actuator may generate the movement between the sleeve and the inner reservoir. The usage of pumps, electronics or batteries is therefore avoided. The relative movement between the sleeve and the inner reservoir is assured by mechanical actuation only, without need for electric power nor for a pump mechanism. The operation of the actuator is kept simple such that the user may instinctively be able to use the writing instrument.

In a first position of the sleeve relative to the inner reservoir, the at least one opening may be covered by the sleeve such that a fluid contact between the inner reservoir and the outer reservoir may be prevented. With that, any flow of fluid through the opening(s) is primarily disabled and a mix between the first medium and the second medium is not possible.

In a second position of the sleeve relative to the inner reservoir, the at least one opening at the first distal area may be uncovered by the sleeve, such as to allow the first medium to flow through the at least one opening at the first distal area. The first medium may enter the outer reservoir and get in fluid contact with the second medium. A microfluidic effect may be created, that allows the first medium to easily flow through the opening. In addition or alternatively, the first medium may be miscible with the second medium. In addition or alternatively, the first medium may be soluble within the second medium. In some embodiments, the first medium may be in suspension within the second medium.

In embodiments, the writing instrument may further comprise at least one opening at a second distal area of the inner reservoir, wherein the first distal area and the second distal area may be sequential. The second distal area may even be adjacent to the first distal area. In a third position of the sleeve relative to the inner reservoir, the at least one opening at the second distal area may be uncovered by the sleeve, such as to allow the first medium to flow through the at least one opening at the second distal area. Further, the third position of the sleeve relative to the inner reservoir may be configured to allow a higher quantity of first medium to flow through the at least one opening at the second distal area compared to the second position of the sleeve relative to the inner reservoir. A higher ratio of the first medium flowing through the opening(s) in the third position may be reached. This has the advantage that, within one single writing instrument, different mixing configurations can be created. Additionally, the first medium ratio reaching the second medium is controlled by varying the position of the sleeve relative to the inner reservoir. The number of openings may be higher in the second distal area than in the first distal area, which would lead to a high ratio of first medium flowing through the openings in a microfluid manner. In an example, the dimensions of the opening(s) on the second distal area may be such that a higher ratio of first medium flows through the opening(s) into the outer reservoir. For any opening configuration, the fact to provide different positions of the sleeve relative to the inner reservoir allows to vary the amount of first medium flowing through the opening(s) and mixing with the second medium.

In embodiments, the writing instrument may further comprise at least one opening at a third distal area of the inner reservoir, wherein the second distal area and the third distal area may be sequential. The third distal area may even be adjacent to the second distal area. In a fourth position of the sleeve relative to the inner reservoir, the at least one opening at the third distal area may be uncovered by the sleeve, such as to allow the first medium to flow through the at least one opening at the third distal area. The fourth position of the sleeve relative to the inner reservoir may be configured to allow a higher quantity of first medium to flow through the at least one opening at the third distal area compared to the third position of the sleeve relative to the inner reservoir. The fourth position may further allow to extend the fluid control of the first medium flowing through the opening(s) and getting in contact (and/or even mixing) with the second medium. This increases the performance of the writing instrument and enhances the versatility of the writing instrument possibilities.

In other embodiments, the second distal area may not be adjacent to the first distal area and/or the third distal area may not be adjacent to the second distal area.

The writing instrument may further comprise an indicator configured to interact with the actuator such as to indicate to the user whether the position of the sleeve relative to the inner reservoir is in the first position, in the second position, in the third position or in the fourth position.

In some embodiments, the sleeve and the inner reservoir may be rotatable with respect to each other. The sleeve may comprise a slot at a distal end region. In any of the second, the third or the fourth position, the slot may be configured to at least match with the respective at least one opening of the inner reservoir, such that the respective at least one opening may be uncovered by the slot.

In one example, the slot may extend axially on the sleeve, the distal areas may extend axially on the inner reservoir, and the distal areas may be arranged in radial sequential order. The distal areas may even be radially adjacent to each other. In each of the second, the third and the fourth position, the slot may be configured to uncover the at least one opening of only the respective distal area of the inner reservoir. In other embodiments, the distal areas may not be adjacent to each other, but rather separated or even located in a different area of the inner reservoir.

In an example, the slot may extend radially on the sleeve, the distal areas of the inner reservoir may extend radially around the inner reservoir, and the distal areas may be arranged in radial sequential order. The distal areas may even be radially adjacent to each other. In each of the second, the third and the fourth position, the slot may be configured to simultaneously uncover the at least one opening at the respective distal area of the inner reservoir and the at least one opening at the distal area of the lower numbered positions. In other embodiments, the distal areas may not be adjacent to each other, but rather separated or even located in a different area of the inner reservoir.

In other embodiments, the sleeve and the inner reservoir may be axially slidable relative to each other. The distal areas may extend in radial direction around the inner reservoir and the distal areas may be arranged in axial sequential order. The distal areas may even be axially adjacent to each other. In other embodiments, the distal areas may not be adjacent to each other, but rather separated or even located in a different area of the inner reservoir.

In embodiments, the first medium may be a dilution medium such as a solvent or a neutral base. and/or the second medium may be a writing medium such as an ink. For e.g. markers, the neutral base may be an uncolored base. A color shade of the mix of the first medium and the second medium in the second position of the sleeve relative to the inner reservoir may be lighter compared to a color of the second medium when the sleeve and the inner reservoir are in the first position. Further, a color shade of the mix of the first medium and second medium in the third position may be lighter compared to the color shade of the mix of the first medium and the second medium in the second position. Moreover, a color shade of the mix of the first medium and second medium in the fourth position may be lighter compared to the color shade of the mix of the first medium and the second medium in the third position.

In embodiments, the writing instrument may further comprise a mixing chamber. The mixing chamber may be arranged at the distal end of the writing instrument, before a writing tip of the writing instrument. The mixing chamber may allow for the first medium and the second medium to get mixed with each other before being conveyed by the writing tip out of the writing instrument to the writing surface.

In an embodiment, the first medium may be stored within the outer reservoir and the second medium is stored in the inner reservoir. The inverted arrangement of the two media does not alter the set-up nor the function of the writing instrument and its embodiments as disclosed above. In contrary, it allows a certain flexibility concerning the filling of the inner and the outer reservoir.

The writing instrument of the present disclosure has the advantage to provide in one single tool several shades of a unique color. The number of different shades depends on the number of different positions that the writing instrument is designed for. Additionally, by actuating the actuator, the user can manually and stepwise select the color shade he/she wishes to use. Through a purely mechanical relative movement between the sleeve and the inner reservoir, the user can control the dilution medium ratio reaching the writing medium. In fact, the varying number of microchannels (openings) permits to create different dilution ratios of the writing medium, this in one single tool.

Moreover, the writing instrument of the present disclosure permits to combine the color shading versatility of several individual writing instruments, such as for example liquid paint tools, with the "on-the-go" mobility and agility of writing instruments (e.g. markers, highlighters, pens etc).

Further, the writing instrument of the present disclosure allows to design a simple, compact and strictly mechanical writing device without requirement for electric power, electronics nor pump mechanisms. By taking the advantage of the inherent compatibility between the dilution medium (e.g. solvent or neutral base/uncolored base) and the writing medium (e.g. ink), a passive flow effect is created between the reservoirs. Additionally, components such as felt tips may be used to create a capillarity effect, which enhances the suction of the dilution medium and the writing medium. In the same manner, writing on a writing surface (in particular a paper surface) may contribute to the capillarity effect. A mixing chamber may be arranged at the distal end of the writing instrument, before the writing tip of the writing instrument. The mixing chamber may be configured to receive the first medium and the second medium such that the first medium and the second medium may get mixed with each other before being conveyed by the writing tip out of the writing instrument to the writing surface. In other embodiments, the mixing chamber and/or mixing channel may be arranged at another location of the writing instrument.

Finally, the manufacturing costs of the writing instrument of the present disclosure can be kept at a low level compared to writing instruments using pump devices and/or electric devices. The simple mechanism permits to reduce the risk of malfunction, which renders the writing instrument more reliable.

DESCRIPTION OF THE DRAWINGS

Additional characteristics and advantages of the disclosure will be described in reference to the following figures in which.

On different figures, the same reference signs designate identical or similar elements.

DETAILED DESCRIPTION

Figure 1:
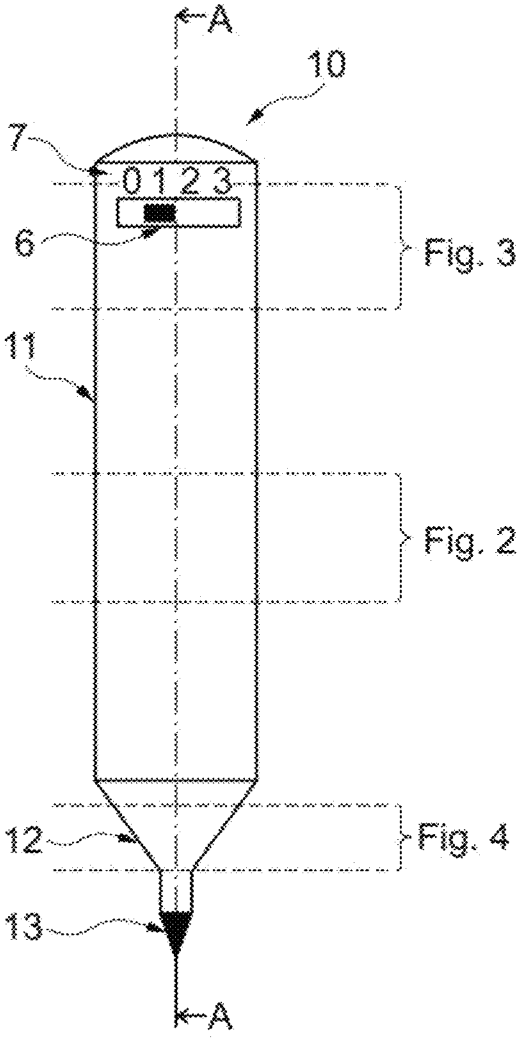
FIG. 1 is a front view of a first example of a writing instrument according to the present disclosure.

FIGS. 1 to 8 illustrate a first example of a writing instrument according to the present disclosure. As shown in FIG. 1, the writing instrument 10 has a casing 11, a distal end 12 and a writing tip 13 at the distal end 12. At a proximal end, the writing instrument presents an actuator 6 configured to be moved by a user in a window, relative to the casing 11. An indicator 7 is arranged on the casing 11 above the window to indicate to the user the position of the actuator. The indicator 7 as shown indicates the positions “0”, “1”, “2” and “3”. The actuator 6 may be movable in the radial direction of the writing instrument.

Figure 3:
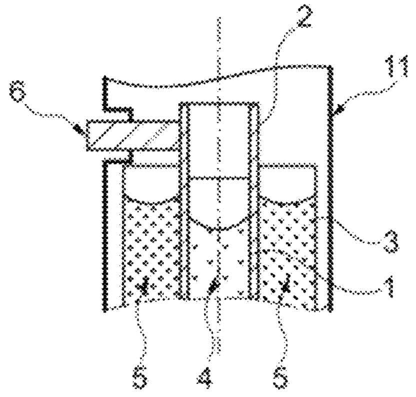
FIG. 3 is a cross-sectional view in A-A direction of the region of the writing instrument of FIG. 1 comprising the actuator.
Figure 2:
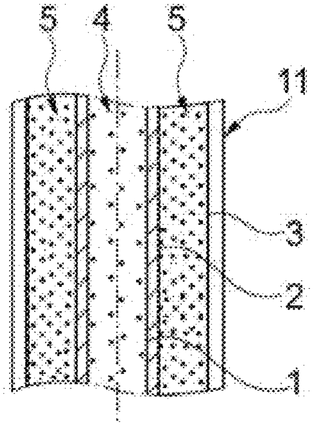
FIG. 2 is a cross-sectional view in A-A direction of a portion of the writing instrument of FIG. 1 and FIG. 4.

FIG. 2 represents an enlarged cross-sectional view of a central region of the writing instrument. The writing instrument 10 comprises an inner reservoir 1 for storing a first medium 4, a sleeve 2 at least partially surrounding the inner reservoir 1 and an outer reservoir 3 for storing a second medium 5. The first medium may be a dilution medium such as a solvent or a neutral (e.g. an uncolored base) and the second medium may be a writing medium such as a writing ink. The first medium may be miscible with the second medium. In addition or alternatively, the first medium may be soluble with the second medium. The type of media will be discussed in more detail later. The inner reservoir 1 and the sleeve 2 are arranged at least partially within the outer reservoir 3. As can be seen on FIGS. 4*a* to 4*c*, which represent enlarged partial perspective views of the distal end region of the writing instrument 10, the inner reservoir 1 comprises at least one opening at a first distal area of the inner reservoir 1. Further, as depicted in FIG. 3, which shows an enlarged cross-sectional view of the proximal region of the writing instrument 10, the writing instrument 10 also comprises an actuator 6. The inner reservoir 1 and the sleeve 2 are movable with respect to each other by actuation of the actuator 6. The actuator 6 is configured to be actuated by a user, wherein the actuation of the actuator 6 generates the movement between the sleeve 2 and the inner reservoir 1. As shown in FIG. 3, the actuator 6 may be connected to the sleeve 2 and a may permit to move (rotate) the sleeve 2 around a longitudinal axis of the writing instrument 10. The inner reservoir, the sleeve and the outer reservoir may extend longitudinally within the casing 11 of the writing instrument. The inner reservoir my by cylindrical and the sleeve and the outer reservoir may be tubular, as shown. In an example, the inner reservoir, the sleeve and/or the outer reservoir may have other cross-sections, such as triangular, rectangular, hexagonal or others.

Figure 5:
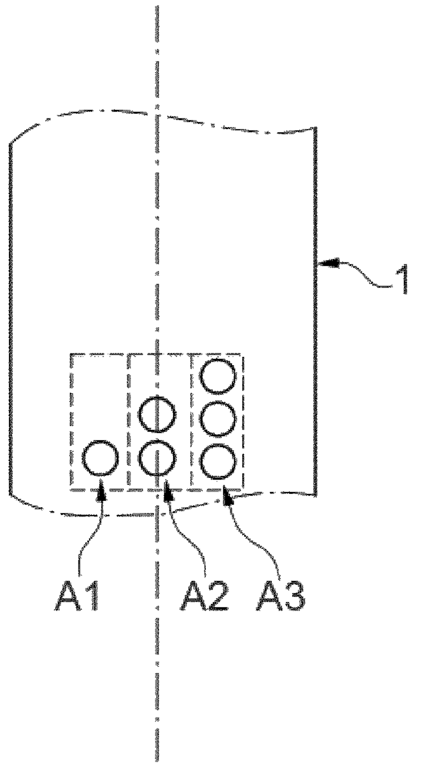
FIG. 5 is a partial front view of a distal end region of the inner reservoir of FIG. 1.

FIG. 5 shows in dotted lines the locations of a first distal area A1, a second distal area A2 and a third distal area A3 on the inner reservoir 1. Each distal area may comprise at least one opening, i.e., the writing instrument 10 may comprise at least one opening 8*a* at a first distal area A1 of the inner reservoir 1, and/or at least one opening 8*b* at a second distal area A2 of the inner reservoir 1, and/or at least one opening 8*c* at a third distal area A3 of the inner reservoir 1. In the first example of writing instrument, the first distal area A1 comprises one opening, the second distal area A2 comprises two openings and the third distal area A3 comprises three openings. In an example, the number of openings increases with the number of the distal area. Nevertheless, each distal area can comprise one or more openings. Ideally, the first distal area, the second distal area and the third distal area may be arranged in a sequential order. In some embodiments, the second distal area may even be adjacent to the first distal area and/or the third distal area may be adjacent to the second distal area. In other examples, the distal areas may not be adjacent to each other, but may rather be separated or even located in a different area of the inner reservoir.

Figure 4A:
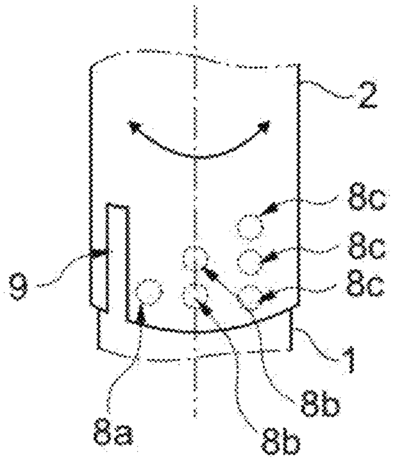
FIGS. 4*a*, 4*b*, 4*c* are partial perspective views of the configuration of the sleeve and the inner reservoir of the writing instrument of FIG. 1, in three different positions.
Figure 4B:
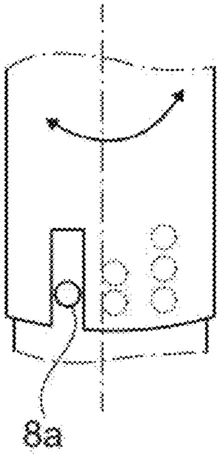
Figure 4C:
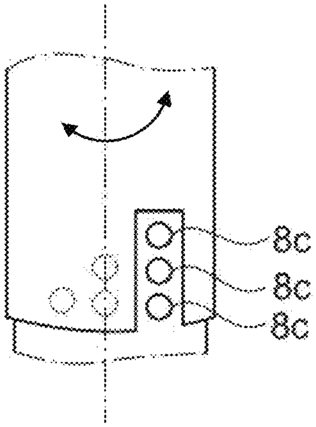

FIGS. 4*a* to 4*c* show three different positions of the sleeve 2 relative to the inner reservoir 1. In a first position of the sleeve 2 relative to the inner reservoir 1 (see FIG. 4*a*), the at least one opening may be covered by the sleeve 2 such that a fluid contact between the inner reservoir 1 and the outer reservoir 3 is prevented. Openings on the inner reservoir 1 are shown in dotted lines and are, in the first position, behind an inner wall of the sleeve 2. In a second position of the sleeve 2 relative to the inner reservoir 1 (see FIG. 4*b*), the at least one opening at the first distal area A1 is uncovered by the sleeve 2, such as to allow the first medium 4 to flow through the at least one opening at the first distal area A1. In a third position (not shown) of the sleeve 2 relative to the inner reservoir 1, the at least one opening at the second distal area A2 is uncovered by the sleeve 2, such as to allow the first medium 4 to flow through the at least one opening at the second distal area A2. In a fourth position of the sleeve 2 relative to the inner reservoir 1 (see FIG. 4*c*), the at least one opening at the third distal area A3 is uncovered by the sleeve 2, such as to allow the first medium 4 to flow through the at least one opening at the third distal area A3.

In the example of FIGS. 1 to 5, the sleeve 2 and the inner reservoir 1 are rotatable with respect to each other. As can be seen in FIGS. 4*a* to 4*c*, the sleeve 2 may comprise a slot 9 at a distal end region. In any of the second, the third or the fourth position, the slot 9 is configured to at least match with the respective at least one opening 8 of the inner reservoir 1, such that the respective at least one opening 8 is uncovered by the slot 9.

In this first example, the number of openings 8 increases with the number of the distal area, i.e., the second distal area A2 comprises more openings 8*b* than the first distal area A1, and the third distal A3 area comprises more openings 8*c* than the second distal area A2 (see FIGS. 4*a* to 4*c* and FIG. 5). Therefore, the third position of the sleeve 2 relative to the inner reservoir 1 allows a higher quantity of first medium 4 to flow through the at least one opening 8*b* at the second distal area A2 compared to the second position of the sleeve 2 relative to the inner reservoir 1. In the same manner, the fourth position of the sleeve 2 relative to the inner reservoir 1 allows a higher quantity of first medium 4 to flow through the at least one opening 8*c* at the third distal area A3 compared to the third position of the sleeve 2 relative to the inner reservoir 1.

Coming back to FIGS. 4*a* to 4*c*, the slot 9 may extend axially on the sleeve. It may have the form of a rectangular cut-out from the distal end of the sleeve. It may be open at the distal end as shown in the figures or it may be closed. The form of the slot may also be any other form such as triangle, round, hexagonal, or any other geometrical or free form. The dimensions of the slot may be such that in each of the second, the third and the fourth position, the slot is configured to uncover the one or more opening of at least the respective distal area of the inner reservoir. In particular, the writing instrument may be configured such that in each of the second, the third and the fourth position, the slot is configured to uncover the one or more opening of only the respective distal area of the inner reservoir. Further, as depicted in FIGS. 4*a* to 4*c*, the distal areas may extend axially on the inner reservoir 1, and the distal areas may be arranged in radial sequential order. The distal areas may even be radially adjacent to each other, as depicted. In more details, the first distal area A12, the second distal area A2 and the third distal area A3 all extend axially along the longitudinal axis of the inner reservoir. In the example shown, all three areas extend parallel to each other (in other examples the areas may not extend parallel to each other). The second distal area A2 is radially sequential and adjacent to the first distal area A1 and the third distal area A3 is radially sequential and adjacent to the second distal area A2. In other examples, the distal areas may not extend adjacent to each other, but may rather be separated or even located in a different area of the inner reservoir.

The position of the sleeve 2 relative to the inner reservoir 1 is controlled by means of the actuator 6. The actuator 6 can be designed as a movable slider as shown in FIGS. 1 and 3 or, in an example, the actuator may be in form of a dial, such as a knurled dial, a knurled thumb dial, a button, a pusher, or any other form that allow the user to move it in a simple and effective manner. The actuator may be integrally formed with the sleeve or may be fixedly or removably attached to the sleeve. Generally, for ergonomic and construction reasons, the actuator may be located at a proximal end of the writing instrument. However, the actuator may be located on another area of the writing instrument. The outer surface of the actuator may be directly contacted by a finger of the user to be moved (e.g., rotated, slid or twisted). The surface of the actuator may be smooth, rough, present a particular surface texture from design or for example a particular coating (such as rubber).

As shown in FIG. 1, the writing instrument may further comprise an indicator 7. The indicator 7 is configured to interact with the actuator 6 such as to indicate to the user whether the position of the sleeve 2 relative to the inner reservoir 1 is in the first position, in the second position, in the third position or in the fourth position. The indicator 7 may be in form of numerals, as shown in FIG. 1, or it can be in form of color and/or shade indications, in form of test, in form of signs or any other visual form. It may also be detectable by touch. It may also light up. In FIG. 1, the user in informed about four positions being: position "0", which may correspond to the first position of the sleeve relative to the inner reservoir (FIG. 4*a*), wherein all openings of the inner reservoir are closed by the sleeve; position "1", which may correspond to the second position of the sleeve relative to the inner reservoir (FIG. 4*b*), wherein the opening of the first distal area is uncovered by the sleeve; position "2", which may correspond to the third position of the sleeve relative to the inner reservoir, wherein the openings of the second distal area are uncovered by the sleeve; and position "3", which may correspond to the fourth position of the sleeve relative to the inner reservoir, wherein the openings of the third distal area are uncovered by the sleeve.

Figure 6:
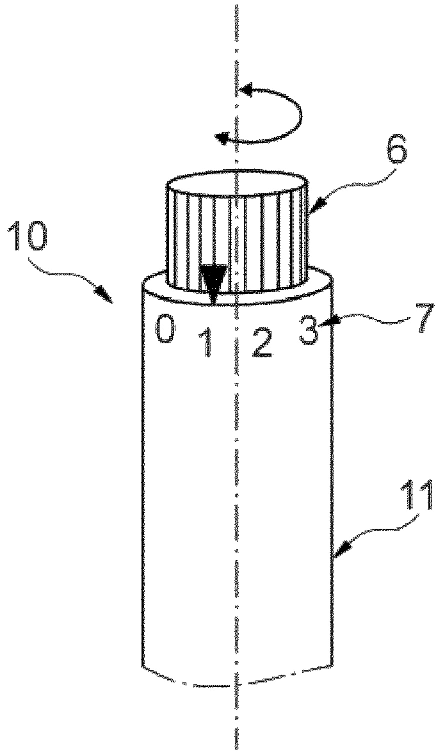
FIG. 6 is a perspective view of an alternative actuator of the writing instrument of FIG. 1.

FIG. 6 shows an alternative location of the actuator 6 on the writing instrument 10. As shown, the actuator 6 can also be located axially on a top side (proximal end) of the writing instrument. The arrow shows that the actuator can be turned (rotated) around the longitudinal axis to generate a rotation of the sleeve relative to the inner reservoir. Further, the actuator may comprise a tip or any other device or marking configured to point on the numeral of the indicator 7 corresponding to the current position of the sleeve relative to the inner reservoir.

The actuator may be configured to mechanically orientate the sleeve in stop positions, such that the defined first to fourth positions present precise latching-or locking positions. In fact, the sleeve should not be able to rotate freely without actuation of the actuator by the user. Any type of latching or locking mechanism can be used herein and combined with the components described above. The positions of the sleeve relative to the inner reservoir may be controlled by locking mechanism using rotation, sliding and/or twisting. This may allow for incremental selection of the numbered position of the sleeve relative to the inner reservoir.

In the example described, the inner reservoir and the outer reservoir may be static within the casing, while the sleeve may be rotatable by actuation of the actuator. In other examples, the actuator may be connected to the inner reservoir; the sleeve and the outer reservoir may be static while the inner reservoir may be rotatable about a longitudinal axis.

One example of the usage of the writing instrument as described in the first example may be as follows: the user may turn the actuator to the desired numbered position. As direct effect, the sleeve is rotated. This being, the slot of the sleeve is positioned on the distal area that matches with the numbered position. The first medium (i.e., dilution medium) may flows in a microfluidic manner through the openings of the inner reservoir toward the second medium (i.e. writing medium). The first and the second medium may get mixed at the distal end of the writing instrument. This mixing results in dilution of the writing medium, which itself results in the creation of the desired and selected color shade. By turning the actuator to another numbered position, the sleeve will turn and, depending on the selected position, more or less, or even no dilution medium (first position, i.e. position "0") flows through the opening(s). Therefore, the color shade can reach from the full color of the writing medium to different grades of shade of this color.

The openings may generate a capillarity effect. In fact, the first medium may flow in a micro-fluidic manner through the openings, which may be micro-openings. The size of the openings (see further below in the disclosure) may be chosen in dependance of the media used, such that a capillarity effect is generated that allows the first medium to be sought through the openings. The writing tips may be made of e.g., felt or having a sponge-like structure and may assist in the suction of the medium. The medium may be absorbed by capillarity of the writing tip texture. In addition or alternatively, a capillarity effect may be generated while writing. In fact, the writing surface (e.g., a paper surface) may also contribute to absorb the first medium and the second medium when the writing tip of the writing instrument is in contact with the writing surface. This leads to the fact that the dilution medium micro-fluidly flows through the opening(s) on the inner reservoir, and that the dilution medium together with the writing medium get conveyed to the writing surface.

The numbered (or pictural or colored or form) positions and the color shade effect generated at each single position may be freely chosen by the writing instrument manufacturer, i.e., for example position "0" may represent the full color of the writing medium, or the most diluted grade of color shade, or any intermediate grade of color shade.

The number of positions that the writing instrument can propose is not limited to four positions. In fact, the positions can be less or more. At least two positions should be available. For example, one position may represent the position in which a flow of dilution medium through the opening(s) is prevented and the other position may represent a position in which at least one opening is uncovered such that the dilution medium can flow through the opening(s). In an example, both positions may allow dilution medium to flow through opening(s) of the inner reservoir, wherein one position allow more flow than the other, such as to have at least two grades of color shade.

Figure 7:
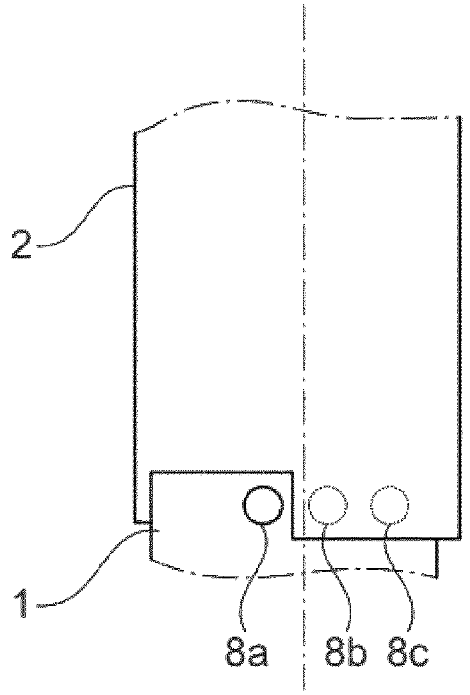
FIG. 7 is a partial perspective view of an alternative configuration of the sleeve and the inner reservoir of the writing instrument of FIG. 1.
Figure 8:
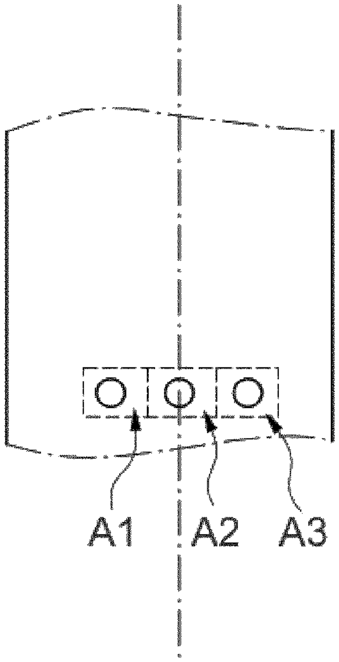
FIG. 8 is a partial front view of a distal end region of the alternative inner reservoir of FIG. 7.

In an embodiment of the first example shown in FIGS. 7 and 8, the slot may extend radially on the sleeve, the distal areas of the inner reservoir may extend radially around the inner reservoir, and the distal areas may be arranged in radial sequential order. In some embodiments the distal areas may even be radially adjacent to each other. In each of the second, the third and the fourth position, the slot may be configured to simultaneously uncover the at least one opening at the respective distal area of the inner reservoir and the at least one opening at the distal area of the lower numbered positions. FIG. 7 illustrates the second position of the sleeve relative to the inner reservoir. The opening of the first distal area A1 is uncovered. The openings of the second distal area A2 and of the third distal area A3 (as shown in FIG. 8) are represented in dotted lines and are covered by the sleeve. In other examples, the distal areas may not be adjacent to each other, but may rather be separated or even located in a different area of the inner reservoir.

Any structural and/or functional aspects described above with respect to the first example of the present disclosure may apply partially or entirely to any other example of the disclosure, including the second described example.

Figure 9:
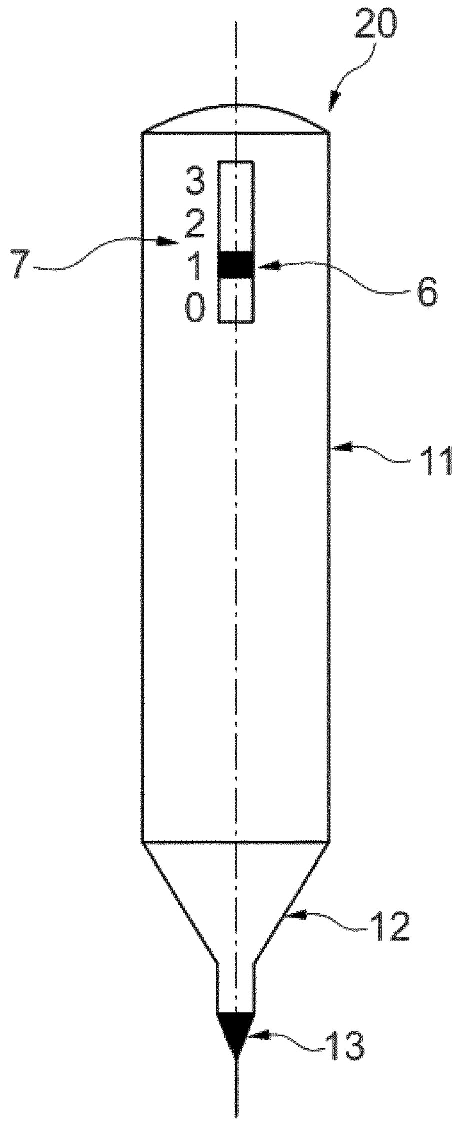
FIG. 9 is a front view of a second example of a writing instrument according to the present disclosure.

FIGS. 9 to 12 illustrate a second example of a writing instrument according to the present disclosure. FIG. 9 shows a similar writing instrument as depicted in FIG. 1 with the exception of the orientation of the actuator 6 and the indicator 7. In FIG. 9, the actuator 6 is configured to be axially slidable at least parallel to the longitudinal axis. In this second example, the sleeve and the inner reservoir are axially slidable relative to each other.

Figure 10:
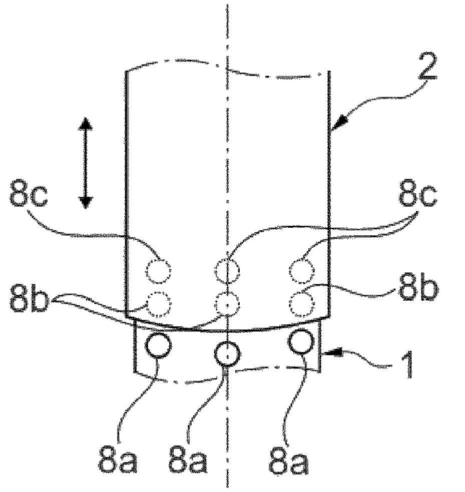
FIG. 10 is a partial perspective view of the configuration of the sleeve and the inner reservoir of the writing instrument of FIG. 9.
Figure 11:
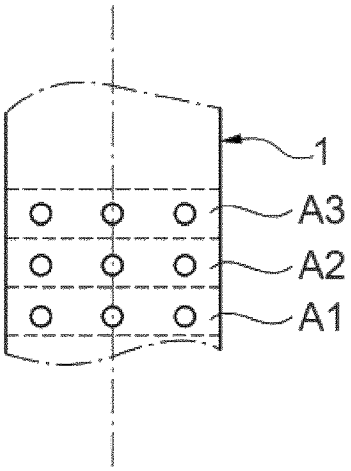
FIG. 11 is a partial front view of a distal end region of the inner reservoir of FIG. 9.

FIGS. 10 and 11 show details of the inner reservoir and the sleeve at their distal end regions. As can be seen in FIG. 11, the distal areas extend in radial direction around the inner reservoir and the distal areas are axially sequential and adjacent to each other. Each distal area A1 to A3 may comprise at least one opening 8, through which the dilution medium 4 flows when the distal area in which the opening 8 is situated is uncovered by the sleeve 2. The two ended arrow in FIG. 10 shows that the sleeve 2 slides axially along the inner reservoir. The figure illustrates the sleeve in the second position, i.e., that the opening(s) **8*a* of the first distal area A1** are uncovered. In other examples, the distal areas may not be adjacent to each other, but may rather be separated or even located in a different area of the inner reservoir.

Figure 12:
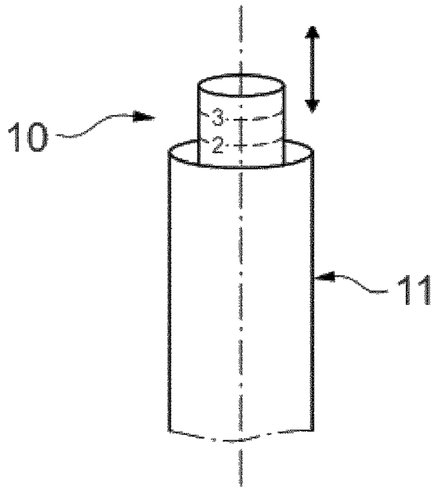
FIG. 12 is a perspective view of an alternative actuator of the writing instrument of FIG. 9.

Another exemplary actuator configuration is depicted in FIG. 12. Herein, the actuator 6 can also be located axially on a top side (proximal end) of the writing instrument. The arrow shows that the actuator can be slid along the longitudinal axis to generate a sliding of the sleeve relative to the inner reservoir. The indicator 7 may be positioned on the actuator itself in kind of circular rings. The current position of the sleeve relative to the inner reservoir may be illustrated by the number of the position that is adjacent to the axial edge of the casing. Any other indicator may be used to indicate to the user the position of the sleeve relative to the inner reservoir.

In any of the described examples and other embodiments of the writing instrument, the distal areas may not be adjacent to each other, but rather separated or even located in a different area of the inner reservoir. In the same manner, each of the distal area may not extend only in a radial or axial direction, but may also extend simultaneously in both directions or have a particular form.

The writing instruments disclosed herein permit to create different color shades of a basis writing medium by instantly mixing the writing medium with an adapted dilution medium. In more detail, a color shade of the mix of the first medium and the second medium in the second position of the sleeve relative to the inner reservoir may be lighter compared to a color of the second medium when the sleeve and the inner reservoir are in the first position. Further, a color shade of the mix of the first medium and second medium in the third position may be lighter compared to the color shade of the mix of the first medium and the second medium in the second position. Moreover, a color shade of the mix of the first medium and second medium in the fourth position may be lighter compared to the color shade of the mix of the first medium and the second medium in the third position. In an example, the color shade may become more and more dark with the increasing numbered position. In an example, the color shade is randomly or willingly arranged such that no continuation of lighter or darker shade is given with increasing or decreasing numbered position of the sleeve relative to the inner reservoir.

In an alternative not shown, the sleeve may comprise a slot extending radially and axially at a distal end region of the sleeve, while the sleeve is configured to slide axially along the longitudinal axis of the inner reservoir. The slot may be open toward the distal end surface of the sleeve or situated further from the end surface and therefore presenting a closed shape. T form of the shape may be of any geometrical or free form.

In this second example, the inner reservoir and the outer reservoir may be static within the casing, while the sleeve may be slidable along the longitudinal axis by actuation of the actuator. In other examples, the actuator may be connected to the inner reservoir; the sleeve and the outer reservoir may be static while the inner reservoir may be rotatable about a longitudinal axis.

In other examples a combination of rotating and sliding behavior between the sleeve and the inner reservoir may be possible.

In still other embodiments, the first medium may be stored within the outer reservoir and the second medium may be stored in the inner reservoir. The effects and function of the writing instrument and its components may not be altered by the inversion of the first and second medium. In fact, the location of the first medium, i.e. the dilution, in the inner or outer reservoir does not influence the microfluidic flow through the opening(s) of the inner reservoir. The only difference may be that the mix of the dilution medium with the writing medium, i.e. the second medium, occurs at another location in the distal end region of the writing instrument.

In some embodiments, a mixing chamber and/or a mixing channel may be arranged at the distal end region of the writing instrument. The mixing chamber and/or channel may be located before a writing tip of the writing instrument and may be configured to receive the first medium and the second medium such that the first medium and the second medium may get mixed with each other before being conveyed by the writing tip out of the writing instrument to the writing surface. In addition or alternatively, the mixing chamber and/or mixing channel may be small sized. In fact, to allow a fast action and delivery of the media, the mixing chamber and/or mixing channel should be sized with a low volume limited amount of mixed solution. In other embodiments, the mixing chamber and/or mixing channel may be arranged at another location of the writing instrument.

In some embodiments, an anti-flow-back device may be provided in or close to the opening(s) to avoid that the medium flows back into its reservoir once it has been mixed with the other medium, or that the writing medium unwillingly flows through the opening(s) to the reservoir containing the first medium, or even that the dilution medium unwillingly flows through the opening(s) of the inner reservoir. A membrane such as for example a unidirectional membrane (e.g. osmosis based) may be used. In an example, a valve such as for example a one-way microvalve may be used to provide the anti-flow-back effect. In fact, a flow-back of the medium may result in contamination of the first medium and/or second medium by the other medium.

The inner reservoir and/or the outer reservoir may be refillable by e.g., opening the casing of the writing instrument at one of its ends. In addition or alternatively, the inner and/or the outer reservoir may be exchangeable. In other embodiments, the reservoirs may not be reusable.

When assembling the writing instrument, the inner reservoir and the sleeve may be assembled first, and the assembly may then be inserted within the outer reservoir. Once inserted, the reservoir may be filled with the medium designated to be in the second reservoir. In an example, the outer reservoir may already be partially filled with the medium such that when inserting the assembly of inner reservoir and sleeve, the medium is pushed up and fills the entire available space. The inner reservoir may be filled before pre-assembly with the outer reservoir. In addition or alternatively, the inner reservoir may be filled once assembled. Ideally the sleeve may be assembled on the inner reservoir such that the sleeve and the inner reservoir are in the first position, i.e., that the opening(s) are covered by the sleeve. In an example, any other of the defined positions may be possible. Ideally, a device may be used or placed on the components to avoid any movement of the sleeve relative to the inner reservoir while assembly. This device may be removable or non-removable. The opening(s) may primarily be covered by a sticker or adhesive cover, which may be removed at a later stage of the assembly process.

The opening(s) may ideally be round, and all have the same dimensions. The dimensions of each of the openings may be in a range of 0,5 μm to 15 μm, in particular in a range of 1 μm to 10 μm, more particularly in a range of 1,2 μm to 8 μm. These dimension ranges allow to have a microfluidic flow of the dilution medium through the opening(s), which also allow for a better mixing control of the two media. The openings may alternatively have any other geometrical or free form. In other embodiments, the opening(s) may have different forms.

The inner reservoir, the outer reservoir and the sleeve may be made of a plastic material such as a polymer. The material may be flexible or rigid. Ideally, the inner and the outer reservoir are flexible and the sleeve is rigid. With that, a smooth functioning of the relative movement of the sleeve relative to the inner reservoir may be assured.

The first medium may be a dilution medium such as a solvent or a neutral base. The dilution medium may be a mixture of various ingredients including a vehicle, such as a solvent (e.g. water or alcohol) or a neutral base (e.g. an uncolored base), and a set of other various additives such as surfactant, preservative, pH regulator and/or others. The dilution medium may be chosen depending on the type of writing medium used.

The second medium may be a writing medium such as an ink. The writing medium may be a mixture of various ingredients including a vehicle (organic solvent and/or water), a color additive and a set of other various additives, such as surfactant, preservative, pH regulator and/or others. The color additive may be e.g. a dye or a pigment.

The first medium may be miscible with the second medium. In addition or alternatively, the first medium may be soluble with the second medium. In fact, the dilution medium may be mixed and/or diluted with the writing medium to create different shades of the color of the writing medium. For example, a higher dilution of the writing medium with the dilution medium may create a lighter shade of the color as a lighter dilution of the writing medium. The solubility of one medium in the other depends, among others, on the viscosity of each of the dilution medium and the writing medium. In fact, a low gap of viscosity between the dilution medium and the writing medium may facilitate the mix of the two media and may allow to create a good color homogeneity. With that, even with low agitation of the writing instrument, both media may properly mix with each other. On the opposite, a high difference of viscosity may result in a less homogeneous mix. globally depends on different factors and viscosity should, in our mind, be pointed out. The mixing chamber and/or mixing channel may contribute to have a homogeneous mix.

The advantages of providing writing instruments as describe in this document are multiple. First, through design, the shade selection may happen stepwise by means of relative movement between the sleeve and the inner reservoir, which controls the dilution medium ratio reaching the writing medium through a respectively varying number of opening (micro-channels). Secondly, the writing instruments as disclosed herein makes use of passive flow effect and respective change of shade by taking advantage of an inherent compatibility between the dilution medium and the writing medium. Thirdly, the writing instrument relies on strictly mechanical actions. In fact, the relative movement between the sleeve and the inner reservoir is assured by mechanical actuation only, without need for electric power nor for a pump mechanism. The operation of the actuator is kept simple such that the user may instinctively be able to use the writing instrument. The usage of pumps, electronics or batteries is therefore avoided. Fourthly, the writing instrument of the present disclosure permits to combine the color shading versatility of several individual writing instruments, such as for example liquid paint tools, with the “on-the-go”

mobility and agility of writing instruments (e.g., markers, highlighters, pens etc). Finally, the manufacturing costs of the writing instrument of the present disclosure can be kept at a low level compared to writing instruments using pump devices and/or electric devices. The simple mechanism permits to reduce the risk of malfunction, which renders the writing instrument more reliable.

Although the present disclosure has been described above and is defined in the attached embodiments, it should be understood that the disclosure may alternatively be defined in accordance with the following embodiments:

1. A writing instrument comprising:

an inner reservoir for storing a first medium, wherein the inner reservoir comprises at least one opening at a first distal area of the inner reservoir;

a sleeve at least partially surrounding the inner reservoir;

an outer reservoir for storing a second medium; and an actuator;

wherein the inner reservoir and the sleeve are movable with respect to each other by actuation of the actuator; and wherein the inner reservoir and the sleeve are arranged at least partially within the outer reservoir.

2. The writing instrument according to embodiment 1, wherein the actuator is configured to be actuated by a user, wherein the actuation of the actuator generates the movement between the sleeve and the inner reservoir.

3. The writing instrument according to any of the preceding embodiments, wherein, in a first position of the sleeve relative to the inner reservoir, the at least one opening is covered by the sleeve such that a fluid contact between the inner reservoir and the outer reservoir is prevented.

4. The writing instrument according to any of the preceding embodiments, wherein, in a second position of the sleeve relative to the inner reservoir, the at least one opening at the first distal area is uncovered by the sleeve, such as to allow the first medium to flow through the at least one opening at the first distal area.

5. The writing instrument according to any of the preceding embodiments, wherein the first medium is miscible with the second medium.

6. The writing instrument according to any of the preceding embodiments, further comprising at least one opening at a second distal area of the inner reservoir, wherein the first distal area and the second distal area are sequential.

7. The writing instrument according to embodiment 6, wherein, in a third position of the sleeve relative to the inner reservoir, the at least one opening at the second distal area is uncovered by the sleeve, such as to allow the first medium to flow through the at least one opening at the second distal area.

8. The writing instrument according to embodiment 7, wherein the third position of the sleeve relative to the inner reservoir is configured to allow a higher quantity of first medium to flow through the at least one opening at the second distal area compared to the second position of the sleeve relative to the inner reservoir.

9. The writing instrument according to any of the preceding embodiments, further comprising at least one opening at a third distal area of the inner reservoir, wherein the second distal area and the third distal area are sequential.

10. The writing instrument according to embodiment 9, wherein, in a fourth position of the sleeve relative to the inner reservoir, the at least one opening at the third distal area is uncovered by the sleeve, such as to allow the first medium to flow through the at least one opening at the third distal area.

11. The writing instrument according to embodiment 10, wherein the fourth position of the sleeve relative to the inner reservoir is configured to allow a higher quantity of first medium to flow through the at least one opening at the third distal area compared to the third position of the sleeve relative to the inner reservoir.

12. The writing instrument according to any of the preceding embodiments, further comprising an indicator configured to interact with the actuator such as to indicate to the user whether the position of the sleeve relative to the inner reservoir is in the first position, in the second position, in the third position or in the fourth position.

13. The writing instrument according to any of the preceding embodiments, wherein the sleeve and the inner reservoir are rotatable with respect to each other.

14. The writing instrument according to embodiment 13, wherein the sleeve comprises a slot at a distal end region, wherein in any of the second, the third or the fourth position, the slot is configured to at least match with the respective at least one opening of the inner reservoir, such that the respective at least one opening is uncovered by the slot.

15. The writing instrument according to embodiment 14, wherein the slot extends axially on the sleeve, wherein the distal areas extend axially on the inner reservoir, and/or wherein the distal areas are arranged in radial sequential order.

16. The writing instrument according to embodiment 15, wherein, in each of the second, the third and the fourth position, the slot is configured to uncover the at least one opening of only the respective distal area of the inner reservoir.

17. The writing instrument according to embodiment 14, wherein the slot extends radially on the sleeve, wherein the distal areas of the inner reservoir extend radially around the inner reservoir, and wherein the distal areas are arranged in radial sequential order.

18. The writing instrument according to embodiment 17, wherein, in each of the second, the third and the fourth position, the slot is configured to simultaneously uncover the at least one opening at the respective distal area of the inner reservoir and the at least one opening at the distal area of the lower numbered positions.

19. The writing instrument according to any of embodiments 1 to 12, wherein the sleeve and the inner reservoir are axially slidable relative to each other.

20. The writing instrument according to embodiment 19, wherein the distal areas extend in radial direction around the inner reservoir and wherein the distal areas are arranged in axial sequential order.

21. The writing instrument according to any of the preceding embodiments, wherein the first medium is a dilution medium such as a solvent or a neutral base.

22. The writing instrument according to any of the preceding embodiments, wherein the second medium is a writing medium such as an ink.

23. The writing instrument according to any of embodiments 5 to 22, wherein a color shade of the mix of the first medium and the second medium in the second position of the sleeve relative to the inner reservoir is lighter compared to a color of the second medium when the sleeve and the inner reservoir are in the first position.

24. The writing instrument according to embodiment 23, wherein a color shade of the mix of the first medium and second medium in the third position is lighter compared to the color shade of the mix of the first medium and the second medium in the second position.

25. The writing instrument according to embodiment 24, wherein a color shade of the mix of the first medium and second medium in the fourth position is lighter compared to the color shade of the mix of the first medium and the second medium in the third position.

26. The writing instrument according to any of the preceding embodiments, further comprising a mixing chamber.

27. The writing instrument according to embodiment 26, wherein the mixing chamber is arranged at the distal end of the writing instrument, before a writing tip of the writing instrument.

28. The writing instrument according to any of the previous embodiments, wherein the first medium is stored within the outer reservoir and the second medium is stored in the inner reservoir.

The invention claimed is:

1. A writing instrument comprising:

an inner reservoir for storing a first medium, wherein the inner reservoir comprises at least one opening at a first distal area of the inner reservoir and at least one opening at a second distal area of the inner reservoir;

a sleeve at least partially surrounding the inner reservoir;

an outer reservoir for storing a second medium;

an actuator;

wherein the inner reservoir and the sleeve are movable with respect to each other by actuation of the actuator;

wherein the inner reservoir and the sleeve are arranged at least partially within the outer reservoir;

wherein the sleeve is configured to be in at least one of a first position, a second position, or a third position relative to the inner reservoir; and wherein at least one of:

the first distal area and the second distal area are sequential, in the third position of the sleeve relative to the inner reservoir, the at least one opening at the second distal area is uncovered by the sleeve, such as to allow the first medium to flow through the at least one opening at the second distal area, or the third position of the sleeve relative to the inner reservoir is configured to allow a higher quantity of first medium to flow through the at least one opening at the second distal area compared to a second position of the sleeve relative to the inner reservoir.

2. The writing instrument according to claim 1, wherein the actuator is configured to be actuated by a user, wherein the actuation of the actuator generates movement between the sleeve and the inner reservoir.

3. The writing instrument according to claim 1, wherein, in a first position of the sleeve relative to the inner reservoir, the at least one opening is covered by the sleeve such that a fluid contact between the inner reservoir and the outer reservoir is prevented, and/or wherein, in the second position of the sleeve relative to the inner reservoir, the at least one opening at the first distal area is uncovered by the sleeve, such as to allow the first medium to flow through the at least one opening at the first distal area.

4. The writing instrument according to claim 1, wherein the first medium is miscible and/or soluble with the second medium, and/or wherein the first medium is a dilution medium configured to be a solvent or a neutral base, and/or wherein the second medium is a writing medium configured to be an ink.

5. The writing instrument according to claim 1, further comprising at least one opening at a second distal area and a third distal area of the inner reservoir, wherein the second distal area and the third distal area are sequential, and/or wherein, in a fourth position of the sleeve relative to the inner reservoir, the at least one opening at the third distal area is uncovered by the sleeve, such as to allow the first medium to flow through the at least one opening at the third distal area, and/or wherein the fourth position of the sleeve relative to the inner reservoir is configured to allow a higher quantity of first medium to flow through the at least one opening at the third distal area compared to the third position of the sleeve relative to the inner reservoir.

6. The writing instrument according to claim 5, further comprising an indicator configured to interact with the actuator such as to indicate to a user whether the position of the sleeve relative to the inner reservoir is in the first position, in the second position, in the third position or in the fourth position.

7. The writing instrument according to claim 5, wherein the sleeve and the inner reservoir are rotatable with respect to each other.

8. The writing instrument according to claim 7, wherein the sleeve comprises a slot at a distal end region, wherein in any of the second, the third or the fourth position, the slot is configured to at least match with the respective at least one opening of the inner reservoir, such that the respective at least one opening is uncovered by the slot.

9. The writing instrument) according to claim 8, wherein the slot extends axially on the sleeve, wherein the distal areas extend axially on the inner reservoir, wherein the distal areas are arranged in radial sequential order, and/or wherein, in each of the second, the third and the fourth position, the slot is configured to uncover the at least one opening of only the respective distal area of the inner reservoir.

10. The writing instrument according to claim 8, wherein the slot extends radially on the sleeve, wherein the distal areas of the inner reservoir extend radially around the inner reservoir, wherein the distal areas are arranged in radial sequential order, and/or wherein, in each of the second, the third and the fourth position, the slot is configured to simultaneously uncover the at least one opening at the respective distal area of the inner reservoir and the at least one opening at the distal area of lower numbered positions.

11. The writing instrument according to claim 5, wherein a color shade of a mix of the first medium and the second medium in the second position of the sleeve relative to the inner reservoir is lighter compared to a color of the second medium when the sleeve and the inner reservoir are in the first position, and/or wherein a color shade of the mix of the first medium and second medium in the third position is lighter compared to the color shade of the mix of the first medium and the second medium in the second position, and/or wherein a color shade of the mix of the first medium and second medium in the fourth position is lighter compared to the color shade of the mix of the first medium and the second medium in the third position.

12. The writing instrument according to claim 1, wherein the sleeve and the inner reservoir are axially slidable relative to each other.

13. The writing instrument according to claim 12, wherein the distal areas extend in radial direction around the inner reservoir, and wherein the distal areas are arranged in axial sequential order.

14. The writing instrument according to claim 1, further comprising a mixing chamber arranged at a distal end of the writing instrument, before a writing tip of the writing instrument.

15. A writing instrument comprising:

an inner reservoir for storing a first medium, wherein the inner reservoir comprises at least one opening at a first distal area of the inner reservoir, at least one opening at a second distal area, and at least one opening a third distal area of the inner reservoir;

a sleeve at least partially surrounding the inner reservoir;

an outer reservoir for storing a second medium; and an actuator;

wherein the inner reservoir and the sleeve are movable with respect to each other by actuation of the actuator;

wherein the inner reservoir and the sleeve are arranged at least partially within the outer reservoir;

wherein the sleeve is configured to be in at least one of a first position, a second position, a third position, or a fourth position relative to the inner reservoir;

wherein at least one of:

the second distal area and the third distal area are sequential, in the fourth position of the sleeve relative to the inner reservoir, the at least one opening at the third distal area is uncovered by the sleeve, such as to allow the first medium to flow through the at least one opening at the third distal area, or the fourth position of the sleeve relative to the inner reservoir is configured to allow a higher quantity of first medium to flow through the at least one opening at the third distal area compared to the third position of the sleeve relative to the inner reservoir.

16. The writing instrument according to claim 15, wherein the actuator is configured to be actuated by a user, wherein the actuation of the actuator generates movement between the sleeve and the inner reservoir.

17. The writing instrument according to claim 15, wherein the sleeve and the inner reservoir are axially slidable relative to each other.

18. A writing instrument comprising:

an inner reservoir for storing a first medium, wherein the inner reservoir comprises at least one opening at a first distal area of the inner reservoir, and at least one opening at a second distal area of the inner reservoir;

a sleeve at least partially surrounding the inner reservoir;

an outer reservoir for storing a second medium; and an actuator;

wherein the inner reservoir and the sleeve are movable with respect to each other by actuation of the actuator;

wherein the inner reservoir and the sleeve are arranged at least partially within the outer reservoir;

wherein the sleeve and the inner reservoir are axially slidable relative to each other;

wherein the distal areas extend in radial direction around the inner reservoir; and wherein the distal areas are arranged in axial sequential order.

19. The writing instrument according to claim 18, wherein the actuator is configured to be actuated by a user, wherein the actuation of the actuator generates movement between the sleeve and the inner reservoir.

20. The writing instrument according to claim 18, further comprising a mixing chamber arranged at a distal end of the writing instrument, before a writing tip of the writing instrument.

* * * * *